Feb. 22, 1944.　　　O. JACOBSEN　　　2,342,347
DIAPHRAGM VALVE
Filed Aug. 2, 1941　　　2 Sheets-Sheet 1
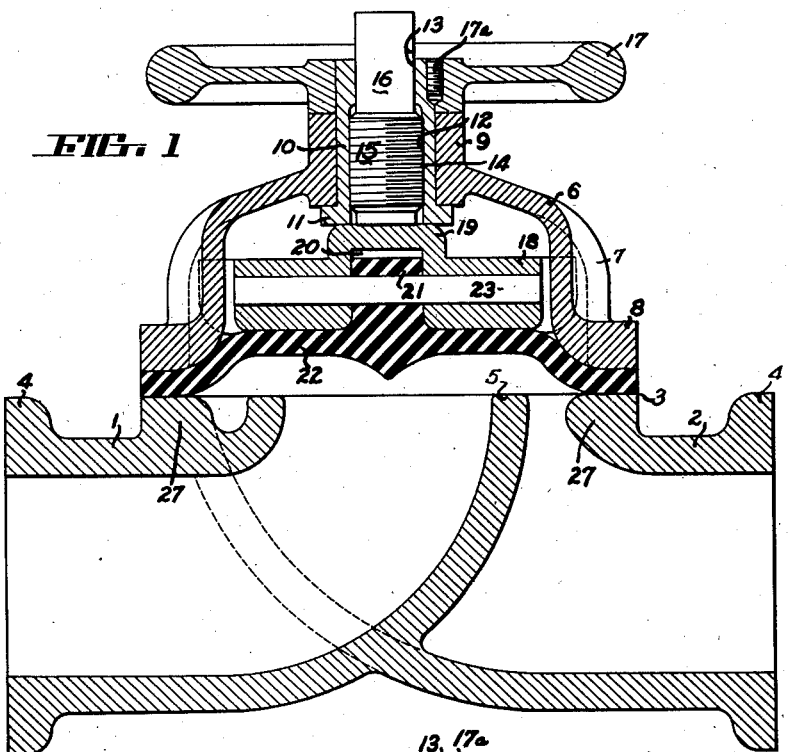
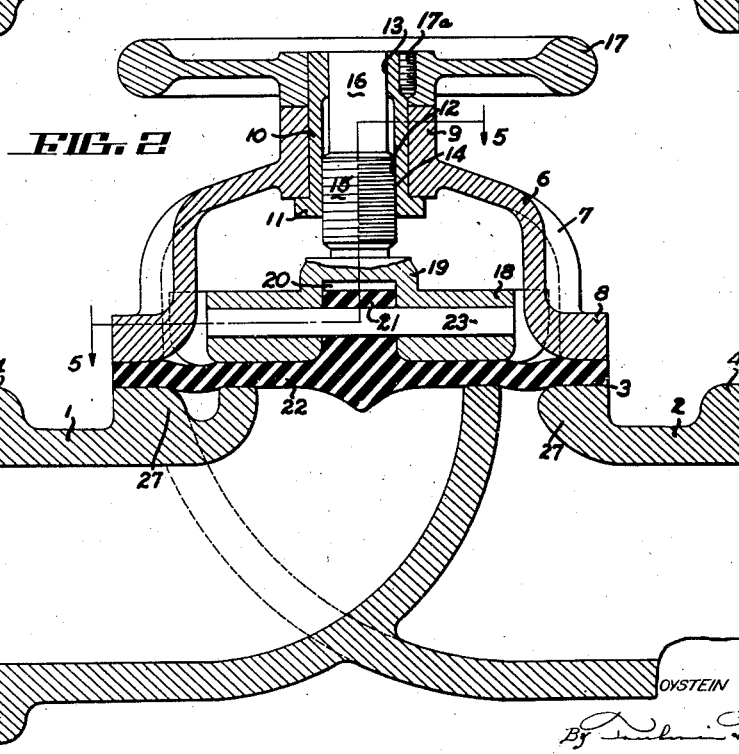
INVENTOR
OYSTEIN JACOBSEN
ATTORNEYS Feb. 22, 1944.   O. JACOBSEN   2,342,347
DIAPHRAGM VALVE
Filed Aug. 2, 1941   2 Sheets-Sheet 2

INVENTOR
OYSTEIN JACOBSEN
ATTORNEYS

UNITED STATES PATENT OFFICE 2,342,347

DIAPHRAGM VALVE

Oystein Jacobsen, Montgomery County, Ohio, assignor to The Duriron Company, Inc., Dayton, Ohio, a corporation of New York Application August 2, 1941, Serial No. 405,223

4 Claims. (Cl. 251—24)

The present invention relates to devices for controlling the flow of fluid through pipes and more particularly to diaphragm valves for regulating the flow between two pipes which are joined together in concentric relation.

There are various ways of connecting a flow control valve in a pipe line. In the case of pipes arranged rectilinearly or angularly with respect to one another but in the same horizontal plane, it is customary to provide the pipes at the valve position with upstanding flanges, the flange of one pipe surrounding that of the other to form a seat for a diaphragm. Thus, the upper edges of these flanges define a pair of concentric circles when looking toward the openings and the arrangement is such that fluid from one of the pipes flows over the flange of smaller diameter into the other pipe. In order to stop or otherwise control the flow of fluid, a flexible diaphragm is generally provided which is caused to seat itself on the upstanding portions of the pipes. A tight seat is assured by giving these upstanding portions a curved configuration and causing the diaphragm to assume the same shape in order to close off the openings in the two pipes.

However, when the backing member for the diaphragm is of spherical shape and its center of curvature does not coincide with the curvature center of the upstanding pipe portions, the diaphragm may not seat itself properly, thus permitting leakage through the valve. Moreover, it is apparent that the shaping of the upper surfaces of the pipes to a curved form, also the shaping of the diaphragm backing member to a corresponding form involve considerable expense.

Accordingly, the primary object of the invention is to provide an improved type of diaphragm valve adapted for use in connection with the junction between pipes arranged in a concentric manner and requiring a diaphragm which closes off both pipes simultaneously and completely. Still another object is to provide a diaphragm valve of such a character that it will not require a valve seat of curved configuration and it is no longer necessary to shape the upstanding portions of the pipes to a curvilinear shape. Thus the improved valve is relatively inexpensive. These objects are attained, in brief, by bringing the upstanding pipe portions at the junction up to the same level, to present a flat seat, and then providing a flat backing member for the diaphragm which forces the latter in flat form against the valve seat thus completely closing all the openings through the valve. Inasmuch as the diaphragm is in flat form, considerable variation can be permitted between the vertical center line of the valve and the center of the two concentrically arranged pipes at the junction without introducing leakage.

As another feature of the invention, I provide a novel and improved structure for securing the flat diaphragm to its flat backing member, the arrangement being such that the diaphragm is readily applied to the backing member and securely held in position without the use of screws, bolts, or locking rods, etc. This improved feature consists in providing the diaphragm with an overhanging lip portion which fits tightly in a depression formed in the backing member.

Other objects and features will be apparent as the specification is perused in connection with the accompanying drawings in which:

Figure 1 represents a sectional view, lengthwise of the valve and showing the diaphragm moved away from the pipes to open the valve.

Figure 2 is a view similar to Figure 1 by showing the valve in closed position.

Figure 6:
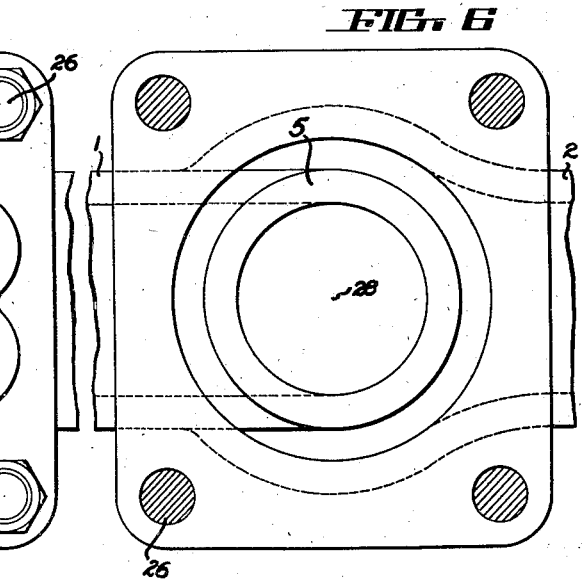
Figure 6 is a plan view looking down on to the openings in the pipes and with the valve structure entirely removed.

Referring more particularly to Figures 1 and 6, numerals 1 and 2 designate two pipes arranged in rectilinear alignment in the same horizontal plane and joined together in such a way that the upper edges of the pipes are arranged concentrically with respect to one another. Thus, the pipe 2 may be enlarged at the joint and its upper edge surrounds the upper surface of the other pipe which is not enlarged. These upper surfaces are brought into a horizontal plane indicated at 3 to form a flat seat for a diaphragm valve.

Each of the pipes 1 and 2 may be provided with flanges 4, 4 for making connection with fluid-carrying conduits (not shown). In practice, fluid may be caused to pass through the pipe 1, and up over the edge 5 of the pipe and through the annular space which immediately surrounds this edge and into the pipe 2. The purpose of the valve which will be described presently, is to close off or otherwise control the flow of the fluid passing from one pipe to the other.

The valve is formed essentially of a bonnet 6, which is provided about its periphery with a plurality of fluted portions 7 (Figure 5), these flutes leaving a number of equidistantly positioned spaces or corrugations on the interior of the bonnet. The latter is also provided with an outwardly extended flange 8 at the position where it rests on the valve seat and the opposite or upper end of the bonnet terminates in a hub or boss member 9. This boss member is cored out to receive a bushing 10 which terminates at the lower end in an outwardly extended flange 11 overlapping the lower surface of the boss 9. The bushing 10 is provided with bores 12, 13 of different diameters, the bore 12 being threaded to receive the shank 14 of the diaphragm adjusting spindle generally designated 15. The spindle is provided with a smooth diameter portion 16 which is slidably received within the bore 13.

Immediately surrounding the upper portion of the bushing 10, there is a handwheel 17 of any suitable design which is secured to the bushing by means of a set screw 17a. The arrangement is such that as the handwheel is rotated the bushing 10 is likewise rotated along the threads of the spindle, causing the latter to move upwardly or downwardly depending upon the direction in which the wheel is turned. The spindle 15 is secured at its lower end to a plate or backing member 18 which is provided at its outer edge with a fluted surface, corresponding to the depressions formed by the flutes in the bonnet member 6. The purpose of this fluted shape on the bonnet and backing member is to prevent the latter from turning when the handwheel 17 is rotated. The backing member 18 is provided with an upstanding boss 19, the upper surface of which contacts with the lower surface of the bushing flange 11, as indicated in Figure 1, when the valve is in its wide open position. The boss 19 is provided with an interior opening 20 of any suitable shape but a round opening is preferred, this opening being adapted to receive a projection 21 which is formed integral with a flexible diaphragm 22 constituted of rubber or any other suitable material. There is an opening extending diametrically through the backing member or plate 18 and a corresponding opening in the diaphragm projection 21, these openings being in line with one another to receive a metal rod 23 for locking the diaphragm 22 in place.

Figure 5:
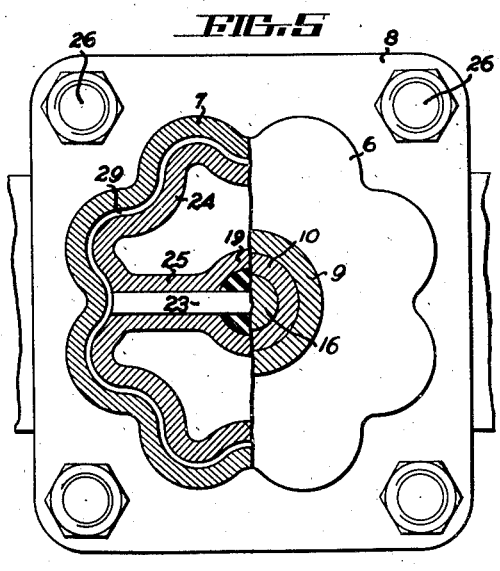
Figure 5 is a view, partly in section taken along line 5—5 in Figure 2.

As shown in Figure 5, the backing member 18 is preferably not made of solid construction but instead, the upper surface is provided with a web 24 around its fluted edge, this web being continued along the diametral position indicated at 25, and terminating in the hub 19. The opening through the backing member for receiving the rod 23 is conveniently taken through the diametral web portion 25, the ends of this opening being preferably positioned midway between an adjacent pair of outwardly extending flutes as can be seen in Figure 5. It is apparent that when the rod 23 has been inserted in place the diaphragm 22 is located securely in position against the backing member 18.

The diaphragm 22 has an outer periphery which conforms to the shape of the flange 8 and as seen in Figures 5 and 6 the latter is preferably of rectangular form. Bolts 26 are provided at each corner of the rectangular flange 8, these bolts passing through the flange, also through openings provided in the diaphragm 22 and being threaded into openings provided in the upstanding portions of the pipe 2. These portions are suitably enlarged as indicated at 27 in order to accommodate the bolts. Thus, the latter serve to secure the bonnet 6 at each corner on to the valve seat formed at the upper surfaces of the portion 27 and the corners of the diaphragm 22 are also locked securely in position.

In order to give a streamline effect to the fluid passing from the pipe 1 over the edge 5 into the pipe 2, the diaphragm may be provided with a downwardly extending tip of conical shape and coinciding with the center of the concentrically arranged pipe portions. The effect of the tip is to cause the fluid passing through pipe 1 to divide equally in all directions and thus readily to flow over the edge 5 into the adjacent pipe.

It has been pointed out that the backing member 18 is provided with a flat solid surface against which the diaphragm 22 rests and inasmuch as the surface 5 of the pipe 1 is directly in line with portions 27 of the pipe 2, the diaphragm is caused to change from a concave shape in its valve open position (Figure 1) to a preferably flat shape in its valve closed position (Figure 2) when the wheel 17 is rotated. It is apparent that the diaphragm in its flat position completely closes off, not only the opening in the pipe 1 but also the annular opening which separates the portions 27 of the pipe 2 from the edge 5 of the pipe 1.

The advantage of causing the diaphragm to assume a flat shape in the valve closed position will now be explained. In the prior form of valves, particularly those cases in which the pipes 1 and 2 are brought together in a concentric arrangement at the valve position, it is customary to give a concave configuration to the edges 5 so that these edges are not brought up to the same height as the portions 27 but are considerably below the upstanding surfaces of the other pipe. The backing member 18 of the prior type of valve is given a shape corresponding to the concavity formed within the pipes 1, 2 so that the diaphragm 22, in resting against the backing member 18, would also be constrained to a concave or spherical shape. Thus, the rotation of the wheel 17 causes the center portion of the diaphragm 22 to enter the pipe 1 while maintaining its spherical shape and the diaphragm contacts with the edges 5. However, should the vertical center line of the diaphragm and its backing member be out of line with the center of the concentrically arranged pipes (this center being indicated at 28 in Figure 6), the diaphragm could not possibly make full contact over the entire surface of the edge 5 because the valve would be closed off center and leakage is bound to happen. This condition is often present in the case of valves which are intended to handle acids and for that reason the active surfaces of the valve including the pipes 1, 2 are made of an acid-resisting metal such as high silicon iron. Metal of this character is almost entirely unmachinable so that the openings in the bonnet 6 for receiving the bolts 26, also the openings in the portions 27 corresponding to the bolt positions must be provided by coring during the molding process. It is well understood in the molding art that it is practically impossible to place these cores accurately according to close dimension and to maintain their particular positions during the metal pouring operation so that there is a strong tendency for these cored openings to occur at positions different from the desired positions. The openings may be so positioned that when the bonnet 6 is secured to the pipes, the center line of the bonnet and that of the diaphragm do not coincide exactly with the center 28 of the valve. However, by providing a diaphragm 22 which takes a substantially flat form in the valve closed position as indicated in Figure 2, greater movement of the center line of the diaphragm with respect to the pipe center 28 can be permitted without causing the slightest leakage through the valve, even when the pressures applied to the fluid are exceedingly high. This flatness in the shape of the diaphragm is brought about by extending the edges 5 of the pipe 1 into a horizontal line with the portions 27 of the pipe 2 and in addition by providing a backing member 18 which has a flat surface next to the diaphragm. It is apparent that the center line of the bonnet 6 can be moved an appreciable distance away from the center 28 and yet the diaphragm will tightly span the openings in the concentrically arranged pipes. In order to accommodate the different positions that the bonnet may take, due to the irregularities in the position of the bolts 26, it may be desirable to provide a space indicated at 29 (Figure 5) between the outer periphery of the backing member and the interior surface of the bonnet.

Figure 3:
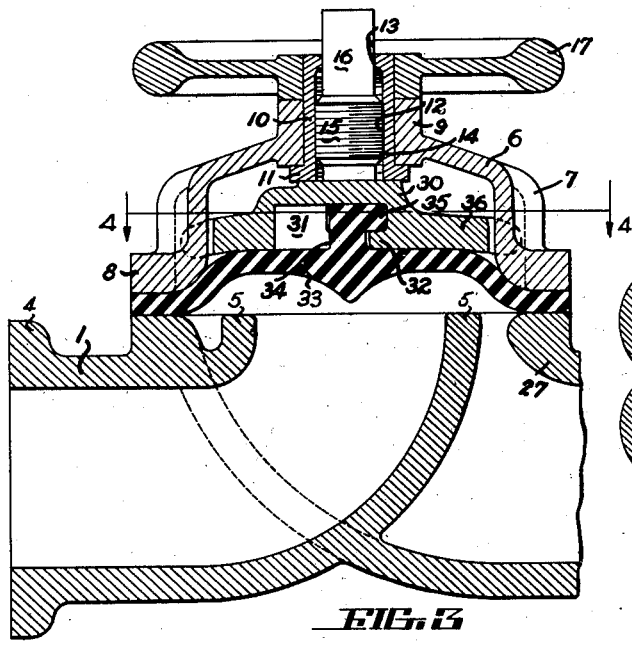
Figure 3 is a longitudinal section taken through the valve, the latter being provided with improved structure for securing the diaphragm to its backing member.
Figure 4:
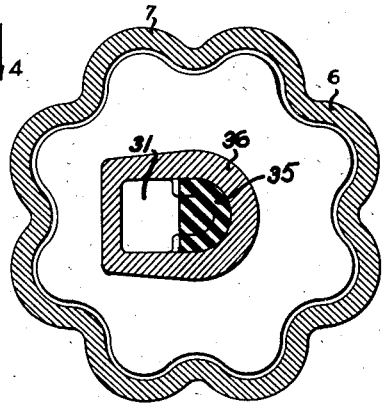
Figure 4 is a sectional view taken along line 4—4 in Figure 3 looking in the direction of the arrows.

Another feature of the present invention is to provide an improved securing means between the diaphragm and the backing member. This feature is illustrated in Figures 3 and 4. The boss 30 of the backing member is given generally a "horse shoe" shape to provide an interior opening 31 having a rectangular shape at one end and a semicircular shape at the other end. There is a C shaped ledge 32 formed integral with the backing member, this ledge extending around the semicircular portion 31 and having a depth less than the depth of the opening to leave a semicircular recess between the inner edge of the ledge and the bottom surface of the opening. The diaphragm 33 which may be of the general form explained in connection with Figure 1 is provided with an upstanding neck portion 34 preferably of a shape partly rectangular and partly semicircular, this neck portion terminating in a larger portion of similar shape which forms a lip indicated at 35. The lip portion has a thickness and shape as snugly to fit within the space formed between the ledge 32 and the bottom of the opening 31. It is apparent that when the lip portion 35 of the diaphragm is pressed into position within its recess as explained above, and the bonnet 6 is also secured in position on the valve seat, it is impossible for the diaphragm to move either in a circular or longitudinal direction with respect to its backing member 36. Thus, the diaphragm is secured to the backing member without the necessity for bolts, screws or even the locking rod 23 referred to in connection with Figure 1. The projections on the backing member 36 and the cooperating portions of the bonnet are of a fluted character. Inasmuch as the remaining elements illustrated in Figure 3 and 4 are similar to those discussed in connection with Figures 1 and 2, 5 and 6, no further description of Figures 3 and 4 appears necessary since corresponding elements are given similar reference characters.

It will be understood that I desire to comprehend within my invention such modifications as come within the scope of the claims and the invention.

Having thus fully described my invention, what I claim as new and desire to secure by Letters Patent is:

1. A valve for controlling the flow of liquid through a plurality of pipes which are concentrically arranged at the joint and present a relatively flat valve seat, said valve including a bonnet positioned over the openings in said pipe at the valve seat, said bonnet being provided with a fluted periphery, a flexible diaphragm for said valve with a flat backing member contained within the bonnet and adapted to be moved away and toward the valve seat in order to cause the diaphragm to close and open the concentrically arranged openings in the pipes, said backing member having a fluted periphery which corresponds to and meshes with the interior flutes of the bonnet, means for securing said diaphragm to the backing member, said means comprising a recess formed in the backing member and a projection on the diaphragm which fits into the recess, and a locking rod which extends diametrically through said backing plate and through the said diaphragm projection, said rod terminating at positions about the periphery of the backing plate, approximately midway between an adjacent pair of flutes at one side of the backing member and midway between a pair of adjacent flutes at the opposite side of the backing member.

2. A valve for controlling the flow of liquid through a plurality of pipes which are concentrically arranged at the joint and present a relatively flat valve seat, said valve including a bonnet having internal flutes, said flutes having depths as measured radially considerably less than the peripheral distances between the flutes, a flexible diaphragm for said valve and a backing member for the diaphragm, said member being provided with peripheral projections which correspond with and fit into the spaces between the flutes of the bonnet, said member also having a flat surface against which the diaphragm rests, a rotary wheel for operating said valve, said member being adapted to move toward and away from the seat of the valve when the wheel is rotated in order to cause the diaphragm to close and open the concentrically arranged openings in the pipes, said backing having a recess and said diaphragm being provided with a projection which extends into said recess, and means comprising a rod for retaining said projection in said recess.

3. A valve for controlling the flow of fluid through a plurality of pipes which are concentrically arranged at the joint and present a relatively flat valve seat, said valve including a bonnet secured to the said pipes at the valve seat and having a fluted configuration, the flutes of said bonnet having depths as measured radially considerably less than the peripheral distances between the flutes, a flexible diaphragm for said valve with a flat backing member contained within the bonnet, a rotary wheel for operating said valve, said member being adapted to be moved away and toward the valve seat when the wheel is rotated in order to cause the diaphragm to close and open the concentrically arranged openings in the pipe, said backing member being provided with a fluted periphery which corresponds to the flutes of the bonnet, whereby the backing member is prevented from rotating when the wheel is rotated and the diaphragm is being moved toward or away from the valve seat, said backing having a recess and said diaphragm being provided with a projection which extends into said recess, and means comprising a rod for retaining said projection in said recess.

4. A valve for controlling the flow of liquid through a plurality of pipes which are concentrically arranged at the joint and present a relatively flat seat, said valve including a bonnet having internal flutes, a flexible diaphragm for said valve and a backing member for the diaphragm, said member being provided with peripheral projections which correspond with and fit in the spaces between the flutes of the bonnet, said member also having a flat surface against which the diaphragm rests, a rotary wheel for operating said valve, said member being adapted to move toward and away from the seat of the valve when the wheel is operated in order to cause the diaphragm to close and open the concentrically arranged openings in the pipes, said backing member being provided with an opening which extends away from the diaphragm, said diaphragm being provided with a projection which extends into the opening of the backing member, and an opening through the backing member which extends between opposite peripheral portions of said member, and an opening through the projection of the diaphragm and coinciding with said last-mentioned openings, said openings being adapted to receive a rod which extends through the backing member and said diaphragm projection.

OYSTEIN JACOBSEN.